(12) United States Patent
Jennings et al.

(10) Patent No.: US 6,692,337 B2
(45) Date of Patent: Feb. 17, 2004

(54) LASER MACHINING

(75) Inventors: Howard Timothy Jennings, Chester (GB); Lin Li, Liverpool (GB)

(73) Assignees: British Nuclear Fuels Plc (GB); University of Manchester Institue of Science and Technology (GB)

( * ) Notice: Subject to any disclaimer, the term of this patent is extended or adjusted under 35 U.S.C. 154(b) by 234 days.

(21) Appl. No.: 09/155,007

(22) PCT Filed: Mar. 14, 1997

(86) PCT No.: PCT/GB97/00714
§ 371 (c)(1),
(2), (4) Date: Jan. 22, 1998

(87) PCT Pub. No.: WO97/34731
PCT Pub. Date: Sep. 25, 1997

(65) Prior Publication Data
US 2001/0003697 A1 Jun. 14, 2001

(30) Foreign Application Priority Data
Mar. 15, 1996 (GB) .............................................. 9605512

(51) Int. Cl.⁷ ................................................. B24C 1/00
(52) U.S. Cl. ..................................... 451/36; 219/121.84
(58) Field of Search ............................. 451/36, 37, 38, 451/39, 40, 60, 67, 102; 219/121.67, 121.72, 121.84, 121.68, 121.69, 121.71, 121.7

(56) References Cited

U.S. PATENT DOCUMENTS

| | | | |
|---|---|---|---|
| 3,749,878 A | 7/1973 | Sullivan et al. | .......... 219/121 L |
| 3,965,328 A | * 6/1976 | Locke | |
| 4,774,392 A | 9/1988 | Orita | ...................... 219/121.63 |
| 4,782,205 A | 11/1988 | Shira | ........................... 219/74 |
| 5,059,256 A | * 10/1991 | Kanapenas et al. | |
| 5,418,350 A | * 5/1995 | Freneaux et al. | |
| 5,759,031 A | * 6/1998 | Goldsmith et al. | |
| 5,795,626 A | * 8/1998 | Gabel et al. | |

FOREIGN PATENT DOCUMENTS

| EP | 0129603 A1 | 1/1985 |
|---|---|---|
| EP | 0303419 A1 | 2/1989 |
| EP | 0303419 B1 | 11/1990 |

* cited by examiner

*Primary Examiner*—Joseph J. Hail, III
*Assistant Examiner*—David B. Thomas
(74) *Attorney, Agent, or Firm*—Myers Bigel Sibley & Sajovec

(57) ABSTRACT

A method of removing material from a workpiece by directing a laser beam onto an area of the workpiece and at the same time injecting substantially continuously a stream of high speed (5–300 m/s) solid particles onto the area of the vicinity thereof. The solid particles may be aluminum oxide or zirconium oxide particles having a size in the range of 1–50 $\mu$m. The particle stream is preferably formed coaxially around the laser beam, the particles being accelerated by means such as an inert gas or electrostatic charge which does not work the material. The laser beam melts the material and the solid particles are directed into the molten material before exiting from the face of the material opposite that to which the stream is directed.

35 Claims, 2 Drawing Sheets

LASER MACHINING

FIELD OF THE INVENTION

This invention relates to laser cutting and machining and, in particular, the use of lasers to cut or machine thick materials or reflective materials such as aluminium and copper. The invention is especially beneficial in cutting or machining hard materials, such as titanium alloys, for example.

BACKGROUND OF THE INVENTION

Several laser cutting and machining processes are known as described below.

The thermal cracking process generates controlled fracture with brittle material such as ceramics and glass. Thermal stress is caused by the absorption of a laser beam and resultant rapid heat generation so that the material can be broken apart in a controlled manner.

The vaporisation process makes use of a focused laser beam to vaporise a material such as wood, copper, rubber or concrete so that the material can break apart in a controlled manner.

Photochemical ablation breaks the bonds between molecules of a material by high energy photons such as those produced by an Excimer laser which gives an ultraviolet laser beam. This process does not involve melting and vaporisation and accordingly little heat is generated. The process is mainly used for micro-machining.

Gas assisted laser cutting involves melting material with a laser beam and blowing the melted material away from the material with gas which is usually applied in a direction coaxial with the laser beam. This is the most efficient and widely used method for metal cutting. Oxygen is often used since additional energy can be produced due to the combustion of the material in the oxygen. Other gases such as nitrogen, argon, helium and carbon dioxide are also used for cutting materials where oxidation is not desired.

Water assisted laser cutting makes use of water instead of gas to blow away the laser generated melt in the cutting of materials.

GB-A-2230222 discloses a method and device for making filters by laser machining. The method makes use of a laser beam and a jet of a working gas. In addition, abrasive particles are introduced, in a periodically pulsed manner, into the jet of the working gas at the moment when the maximum amplitude of the melt metal volume oscillations in the cutting area is obtained. The abrasive action of the solid particles enables the formation of a "Y" shaped cut (drill) slot in the filter manufacturing. A rotating mechanism was used to direct the jet nozzle in the desired direction.

EP-A-129603 describes a laser machining process which uses in combination a laser beam and auxiliary energy (eg plasma). FIG. 5 of EP-A-129603 illustrates an apparatus for performing a version of the process in which a halogen gas or gaseous halogen compound is used to discharge abrasive grains at the workpiece. The abrasive grains contact the workpiece in front of the laser beam. It is taught that the workpiece is effectively worked in a short time under the action of (i) the auxiliary energy (specifically, glow discharge), (ii) the thermal and chemical actions caused as a result of the halogen or halogen compound being radiated by the laser beam, and (iii) the abrasive grains, apparently as well as by the laser beam itself. This complex process involving chemically reactive species is performed within a closed chamber under a pressure of no more than 10 torr.

In prior art processes, the limitation of the thickness of cut and the cut quality, when using a laser, are largely dependent on the gas or water pressure which produce the required momentum to blow the molten material away from the cut zone. Higher laser power does not necessarily guarantee a deeper cut, if the cut quality to be achieved is similar to that with thinner material cutting. For the cutting of material of thick section, the cut quality cannot be maintained using existing methods due to reduced pressure and drag capability of the gas or water vapour at the deeper end of the cutting slot.

The process of EP-A-129603 requires a combination of many techniques, including indispensably a working gas to create chemically reactive species.

It is an object of the present invention to improve laser cutting quality and extend the thickness of the material which may be cut.

According to the present invention there is provided a method of treating an area of a material (eg a workpiece), comprising directing a laser beam onto said area and at the same time directing substantially continuously a stream of high speed solid particles onto said area or the vicinity thereof. The invention includes a method of cutting or machining a material by directing a laser beam into the cut zone and at the same time injecting substantially continuously a stream of high speed solid particles around and into said cut zone. In this way molten material is dragged or blasted away by the solid particles as a result of kinetic energy and momentum transfer. As an alternative to cutting the material, the method may machine it, eg mill it. The term "machining" includes in particular generating a groove, which in practice will be of a desired (predetermined) width and depth.

The present invention also provides apparatus for treating materials including means for performing the invention. The invention therefore includes an apparatus comprising means directing a laser beam into the cut zone and at the same time substantially continuously injecting high speed solid articles around or into said cut zone.

The solid particles should preferably be abrasive particles. Examples of particles which may be used are aluminium oxide ($Al_2O_3$), silicon carbide (SiC) or zirconium oxide (ZrO) as well as other solid particles such as glass beads or metallic powders. Such particles have a much higher density than the gases and water vapour which are currently used. They therefore provide higher momentum if they travel at a similar speed as the gases and water vapour.

Due to the high speed of the injective particles, their absorption of energy from the laser beam is small. To prevent the melting of the injective particles, it is preferred that the particles are formed of material or materials with a higher melting point than the material which is being cut.

Preferably, the size of the particles is in the range 1–250 $\mu$m and more preferably 1–150 $\mu$m (eg 1–50 $\mu$m), the particular size depending on the application. The bottom end point of these ranges is suitably 5 $\mu$m.

Preferably, the speed of travel of the particles prior to reaching the cut zone is in the range from 50–300 m/s, although higher speeds, including supersonic speeds, can be utilised. The speed of the particles is selected partly with a view to minimising the residue of the injected particles remaining on the workpiece at the end of the cutting process.

The particles can be accelerated and delivered to the cut zone by means of a gas stream, for instance, an air stream or water vapour or a suitable solution. As an alternative, particles charged with electricity may be injected making use of an electrostatic accelerator. If this method is used, discharge of the electric charge on the particles may be carried out before they are delivered to the cut zone. In one preferred class of methods, the particles are accelerated to form the particle stream by means which itself substantially does not work the material, such non-working means include compressed air or another effectively inert gas (eg nitrogen) or electric charge. An auxiliary energy source is not necessary.

Where a gas is used for particle delivery and acceleration, it may be a single gas such as oxygen, nitrogen, argon, helium or carbon dioxide or it may be a mixture of gases. Preferably the gas pressure is in the range from 0.5 to 30 bars.

When water vapour is used dust emission can be controlled so that a cleaner process results. It is not an essential feature of the invention that the method be performed in a closed space. The method may therefore be performed in an open atmosphere and the apparatus need not include a closure for separating the workpiece from the environment.

A preferred method of the invention comprises concurrently directing at a material a laser beam and a substantially continuous stream of high speed solid particles, such that the laser beam melts the material and solid particles of said stream are directed into the molten material. In some methods, the material is cut and solid particles from the particle stream exit from the face of the material opposite that to which the stream is directed.

The apparatus of the present invention may include a nozzle, or a number of nozzles with fine orifices which can be used to control the exit characteristics of the particles.

Particle injection may be coaxial to the laser beam or at an angle thereto.

Used solid particles may be collected, passed through a sieve and recycled using an acceleration separation method.

The laser cut zone may be generated by a focused laser beam. The laser may operate in the infrared region, examples of such lasers being a Nd-YAG laser, a $CO_2$ laser, a CO laser and a semiconductor laser. The laser may operate in the visible region, examples being a copper vapour laser, a frequency doubled YAG laser and a ruby laser. Another possibility is that the laser operates in the ultraviolet region, an example being the Excimer laser.

By using the method and apparatus of the present invention, thicker materials can be cut with higher quality than is the case with existing laser cutting methods. The surface roughness (cross-sectional stiration lines) can be improved by the shot blasting of the particles which act to clean the surfaces. Semi-molten or laser-heated (softened) materials can be blown cut by the injected particles with the result that a higher processing speed can be achieved.

SUMMARY OF THE INVENTION

Materials with high surface reflectivity to a laser beam can be roughened along the cut line by means of the impacting particles and before the laser interaction. In this way material such as aluminium and copper which are difficult to cut by traditional laser methods can be cut efficiently.

A further advantage of the present invention is that a lower pressure gas than that used with known methods can be used inside the lens/nozzle chamber with a result that the apparatus costs are lower.

The method of the present invention differs from existing laser particle injection surface treatment processes in which hard wearing powders are injected into a laser melt pool and these particles are fused onto the workpiece surface for the improvement of the wear resistance of the material. The injected particles in such a process are very low speed (<3 m/s). The particles are not reusable and no materials separation is involved, ie molten materials are not removed. Furthermore, laser powder cladding and alloying processes melt and fuse the injected powders to the substrate for the improvement of the surface properties of the materials. Such processes use the injected particles as a material feed and they are melted and fused to the workpiece.

In the present invention, the laser beam can be either focused or defocused. In the case where the laser beam is not focused, the injection particles are used to facilitate the removal of the molten materials. This process can be used for the turning and milling of components which cannot be processed using a laser beam alone or which are difficult to machine using conventional machine tools. As examples of such components may be mentioned those made with titanium alloys and materials of comparable hardness.

Some particular aspects of the present invention will now be mentioned:

a) The particle injection is continuous which enables melt to be removed continuously and efficiently resulting in a continuous laser cutting slot for a moving workpiece.

b) The abrasive particles may be fed to the workpiece in a manner coaxial to the laser beam which enables omnidirectional laser cutting to be performed with uniform quality.

c) The particles may be fed to an area adjacent but prior to the laser cut for the roughening of the reflective surface which will increase the laser beam absorption.

d) In cutting brittle materials such as ceramics and glasses, directing abrasive particles to the immediate area which is weakened by laser heating or scribing may be used to break the materials by sheer stress with little crack formation.

e) The laser beam can either be focused as for cutting and drilling or defocused as in milling, grinding and turning.

f) The abrasive particles may be accelerated and carried to the work area by electric charge or water vapour.

g) Particles may be collected and recycled.

h) Direction of particle injection: If not coaxial, injecting in the leading direction of the melt pool is preferred which has been found to improve the beam absorption efficiency by at least 20% (by blowing hot molten material to the leading edge for preheating and allowing the laser beam to interact with the molten materials). Also surface roughness can be improved by blowing the molten material in the leading direction compared with blowing in the trailing direction.

i) Advantages of abrasive machining compared with gas assisted laser machining: Abrasive laser machining has been found to have higher materials removal efficiency, generating a smaller heat affected zone and to be much less sensitive to the misalignment of the jet to the melt pool.

j) Laser power density: A minimum of 2,000 $W/cm^2$ is required for most engineering metallic materials (depending on material's thermal conductivity and melting point), 200 $W/cm^2$ for ceramic materials or natural stones and 20 $W/cm^2$ for organic materials.

k) Removal depth is proportional to laser power density (for milling). For example, at a linear speed of 300 mm/min and laser beam spot size of 6 mm diameter, 500 W will give 0.2 mm removal depth and, at 800 W, 2.2 mm removal depth was achieved with the slot width of around 5 mm for abrasive laser machining of mild steels.

l) Removal depth is further controlled by traverse speed: When traverse speed of laser across the workpiece is reduced, the removal depth will increase. For example, at 800 W laser power, 3 mm depth was achieved at 60 mm/min speed while 1.5 mm depth was found at 240 mm/min speed for stainless steels.

m) Groove width is controlled by both the laser beam spot size and traverse speed.

n) The material removal rate is independent of the material's hardness but largely determined by the material's thermal conductivity. For example, 20% increase in removal depth can be achieved for stainless steel (lower thermal conductivity) than for mild steel (high thermal conductivity) with the same operating parameters.

o) A circular laser beam will produce a spherical cross-section profile on the machined parts, while a rectangular laser beam will produce a rectangular cross-sectional shape on the machined part.

p) Surface roughness can be controlled to less than 20 µm.

BRIEF DESCRIPTION OF THE DRAWINGS

Embodiments of the present invention will now be described, by way of examples only, and with reference to the accompanying drawings, in which.

DETAILED DESCRIPTION OF THE INVENTION

Figure 1:
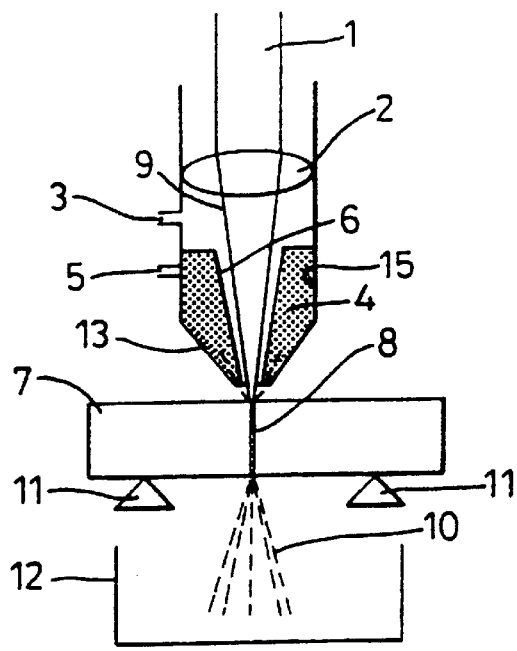
FIGS. 1 to 4 each shows diagrammatically an embodiment of apparatus according to the present invention.

Referring to FIG. 1 of the accompanying drawings, there is shown apparatus for laser cutting with particle injection through a coaxial nozzle. A laser beam 1 is directed through a focusing lens 2 in a direction towards workpiece 7. The apparatus includes a chamber 15, surrounding the laser beam and being loaded with solid particles 4 which are fed to the chamber 15 via feed inlet 5. Gas is fed to the apparatus via gas inlet 3.

The solid particles 4 are injected into the melt zone 8 through the coaxial nozzle 13. The melt zone 8 is created by the focused laser beam 9. The focusing lens 2 is used to focus the laser beam 1 into a small beam size so that the beam energy density is sufficient to cause rapid melting of the workpiece 7 at the focal point.

Molten material 8 is blown down through the opening of the workpiece by the solid particles travelling at a high speed. At the same time a gas can be injected through the gas nozzle 6 to the melt zone so that the lens 2 is protected from the fumes and particles. Furthermore, the gas from the central nozzle 6 can be used to assist the particle injection into the melt zone. Used particles 10 which exit below the workpiece (which is located on workpiece support 11) pass into collector 12. During passage between the workpiece 7 and the collector 12, the used particles 10 can be separated from waste slag as a result of their different particle size and their speed of travel from the cut zone.

Coaxial particle injection is advantageous in that it enables laser cutting to be carried out in any direction.

In a modification of the apparatus of FIG. 1, the coaxial nozzle arrangement includes a third, outer nozzle through which a gas is directed. Such an arrangement may be used to provide a shroud to prevent access of external gas or other contamination to the work area.

Figure 2:
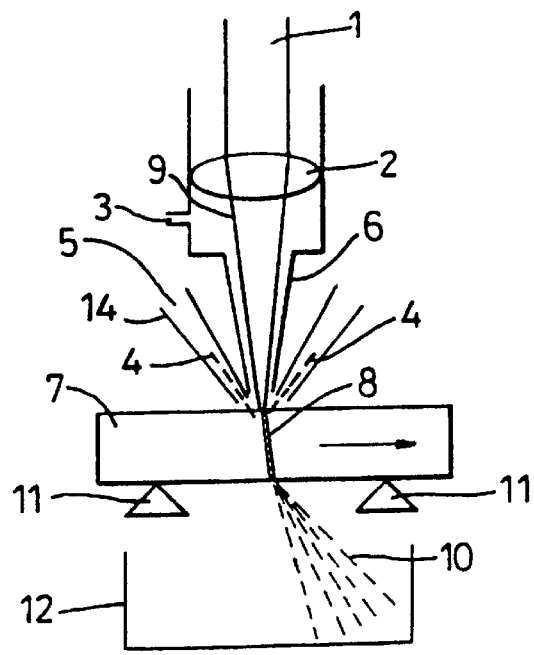

Referring now to FIG. 2 of the accompanying drawings, the same reference numerals have been used as in the case of FIG. 1 for those parts which correspond to similar parts of the apparatus of FIG. 1. In the apparatus of FIG. 2, particle injection is from the side of the laser beam and at an angle thereto. Particle feed member 14 is located by the side of the laser cutting nozzle 6. A plurality of such feed members 14 can be used. Each member is in the form of a tube preferably provided with a converging nozzle (or converging-diverging nozzle) attached to the end. These feed members are arranged so that the particle injection direction is preferably tilted towards the leading end of the cut as indicated by the arrow in FIG. 2. In an alternative embodiment, particle injection in the opposite direction may be used.

Solid particles 4 impact on the molten material 8 so that the molten material can be blown away through the opening of the cut.

The method of the apparatus of FIG. 2 may be particularly efficient when a particular direction of cut is used. It may be less efficient when the direction of cut is quite different.

Figure 3:
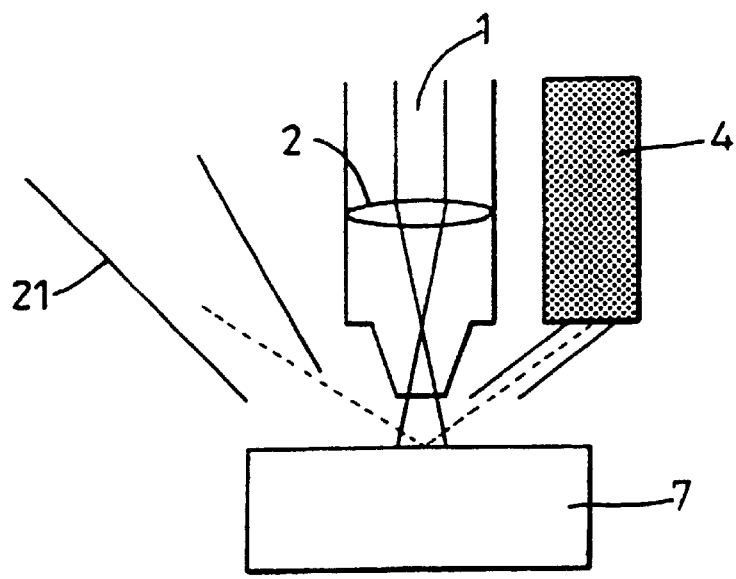

Referring to FIG. 3 of the accompanying drawings, particle injection is from the side as in the case of the FIG. 2 apparatus. The laser is defocused and the workpiece is not cut through. The particles remove the melt and enter extractor 21. Such an arrangement is appropriate for grinding, milling and turning applications. The injection is preferably in the leading direction.

Figure 4:
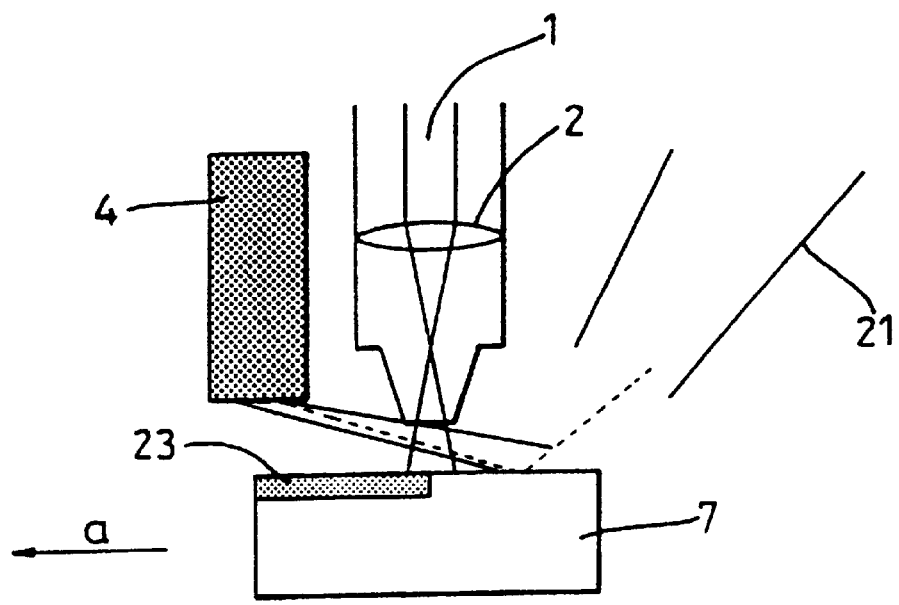

Referring to FIG. 4 of the accompanying drawings, particle injection is directed ahead of the laser beam (and melt track 23) and is used to clean and roughen the surface of the workpiece 7, thereby increasing beam absorption. The particles are collected and recycled via extractor 21. Arrow a shows the direction of movement of the workpiece 7.

The workpiece or material treated by the method of the invention may be subjected to one or more further process for forming the workpiece or material into a product, be it a final product for purchase by a customer or an intermediate in a manufacturing process.

What is claimed is:

1. A method of removing material from a workpiece, the method comprising directing a laser beam onto an area of the workpiece to melt workpiece material and at the same time injecting a continuous, non-pulsed stream of high speed solid particles onto the area or the vicinity thereof to remove molten material from the workpiece, wherein the continuous stream of high speed solid particles entirely encircles the laser beam.

2. A method according to claim 1 in which the solid particles are abrasive particles.

3. A method according to claim 1 in which the solid particles are aluminum oxide or zixcoulum oxide or metal particles.

4. A method according to claim 1 wherein the particles are formed of material with a higher melting point than the material which is being cut or machined.

5. A method according to claim 1 wherein the size of the particles is in the range 1–150 µm.

6. A method according to claim 1 wherein the speed of travel of the particles prior to reaching said area is in the range from 50–300 m/s.

7. A method according to claim 1 wherein a gas, water vapor or a chemical solution is used for particle delivery and acceleration.

8. A method according to claim 7 wherein the gas pressure is in the range from 0.5 to 30 bars.

9. A method according to claim 1 wherein the particles are accelerated to form said stream by means which itself substantially does not work the material.

10. A method according to claim 1 wherein the particles are collected and recycled after leaving the said area or the vicinity thereof.

11. A method according to claim 9 wherein the speed of travel of the particles prior to reaching said area is from 50–300 m/s.

12. A method according to claim 11 wherein the continuous, non-pulsed stream of high speed solid particles are injected into the laser beam at an angle thereto.

13. A method of removing material from a workpiece, the method comprising:

directing a laser beam onto an area of the workpiece to melt workpiece material, wherein melted workpiece material forms a melt pool having a leading direction relative to a direction of travel of the laser beam; and at the same time, injecting a continuous, non-pulsed stream of high speed solid particles into the melt pool in the leading direction to remove molten material from the workpiece, wherein the continuous, non-pulsed stream of high speed solid particles entirely encircles the laser beam.

14. A method according to claim 13 in which the solid particles are abrasive particles.

15. A method according to claim 13 in which the solid particles are aluminum oxide or zirconium oxide or metal particles.

16. A method according to claim 13 wherein the particles are formed of material with a higher melting point than the material which is being cut or machined.

17. A method according to claim 13 wherein the size of the particles is in the range 1–150 μm.

18. A method according to claim 13 wherein the speed of travel of the particles prior to reaching said area is in the range from 50–300 m/s.

19. A method according to claim 13 wherein a gas, water vapor or a chemical solution is used for particle delivery and acceleration.

20. A method according to claim 19 wherein the gas pressure is in the range from 0.5 to 30 bars.

21. A method according to claim 13 wherein the particles are accelerated to form said stream by means which itself substantially does not work the material.

22. A method according to claim 13 wherein the particles are collected and recycled after leaving the said area or the vicinity thereof.

23. A method according to claim 13 wherein the material is cut and solid particles from said stream of high speed solid particles exit from a face of the material opposite from a face of the material to which the stream is directed.

24. A method of removing material from a workpiece by cutting or machining the workpiece, the method comprising directing a laser beam onto an area of the workpiece to melt workpiece material and at the same time injecting a substantially continuous, non-pulsed stream of high speed solid particles onto the area or the vicinity thereof, the particles removing molten material from the workpiece, wherein the continuous, non-pulsed stream of high speed solid particles entirely encircles the laser beam.

25. A method according to claim 24 wherein melted workpiece material forms a melt pool having a leading direction relative to a direction of travel of the laser beam and further comprising injecting the continuous, non-pulsed stream of high speed solid particles into the melt pool in the leading direction to remove molten material from the workpiece.

26. A method according to claim 24 in which the solid particles are abrasive particles.

27. A method according to claim 24 in which the solid particles are aluminum oxide or zirconium oxide or metal particles.

28. A method according to claim 24 wherein the particles are formed of material with a higher melting point than the material which is being cut or machined.

29. A method according to claim 24 wherein the size of the particles is in the range 1–150 μm.

30. A method according to claim 24 wherein the speed of travel of the particles prior to reaching the laser beam is in the range from 50–300 m/s.

31. A method according to claim 24 wherein a gas, water vapour or a chemical solution is used for particle delivery and acceleration.

32. A method according to claim 31 wherein gas pressure is in the range from 0.5 to 30 bars.

33. A method according to claim 24 wherein the particles are accelerated to form said stream by means which itself substantially does not work the material.

34. A method according to claim 24 wherein the particles are collected and recycled after leaving the said area or the vicinity thereof.

35. A method according to claim 24 wherein the material is cut and solid particles from said stream of high speed solid particles exit from a face of the material opposite from a face of the material to which the stream is directed.

* * * * *